No. 814,068. PATENTED MAR. 6, 1906.
F. G. McKIM.
PNEUMATIC TIRE.
APPLICATION FILED MAR. 14, 1905.
4 SHEETS—SHEET 1.
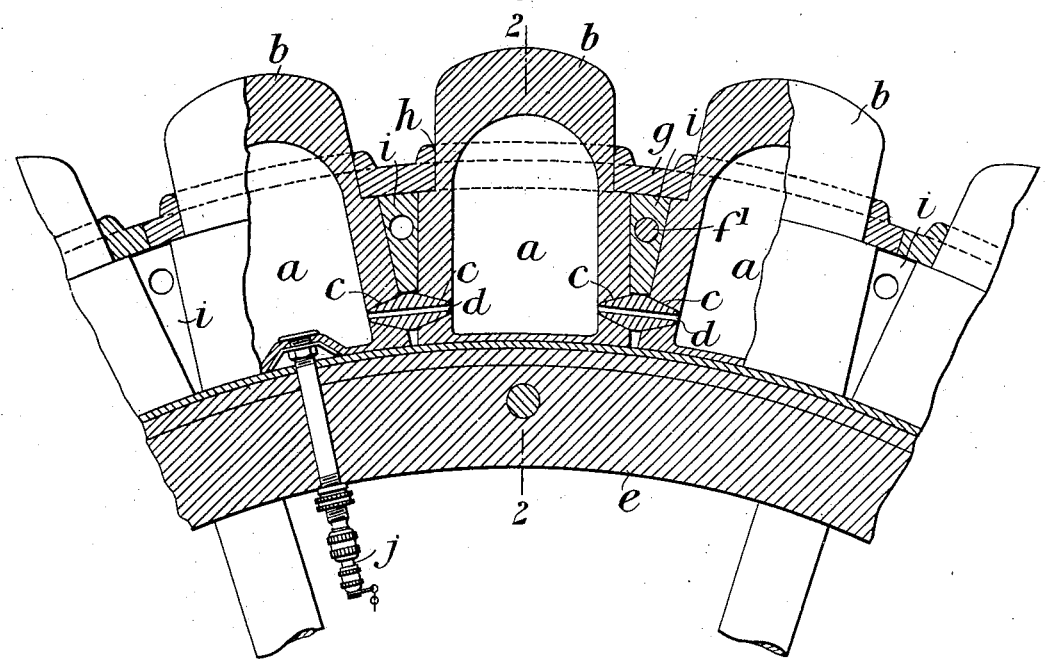
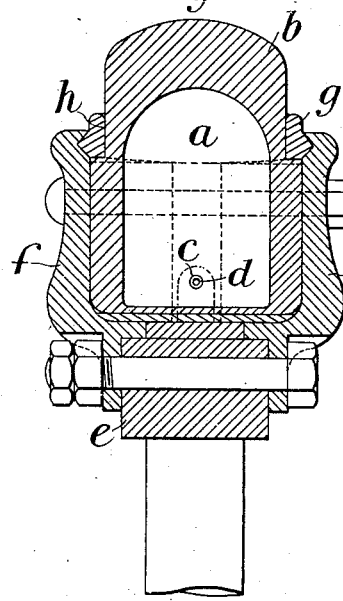
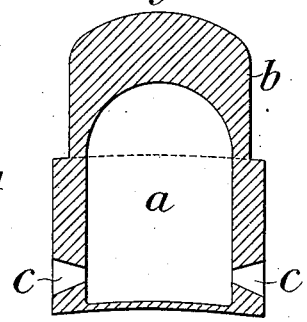
Fig. 5.
Fig. 4.
Witnesses
John E. Dousfield.
C. G. Redfern.
Inventor.
F. G. McKim

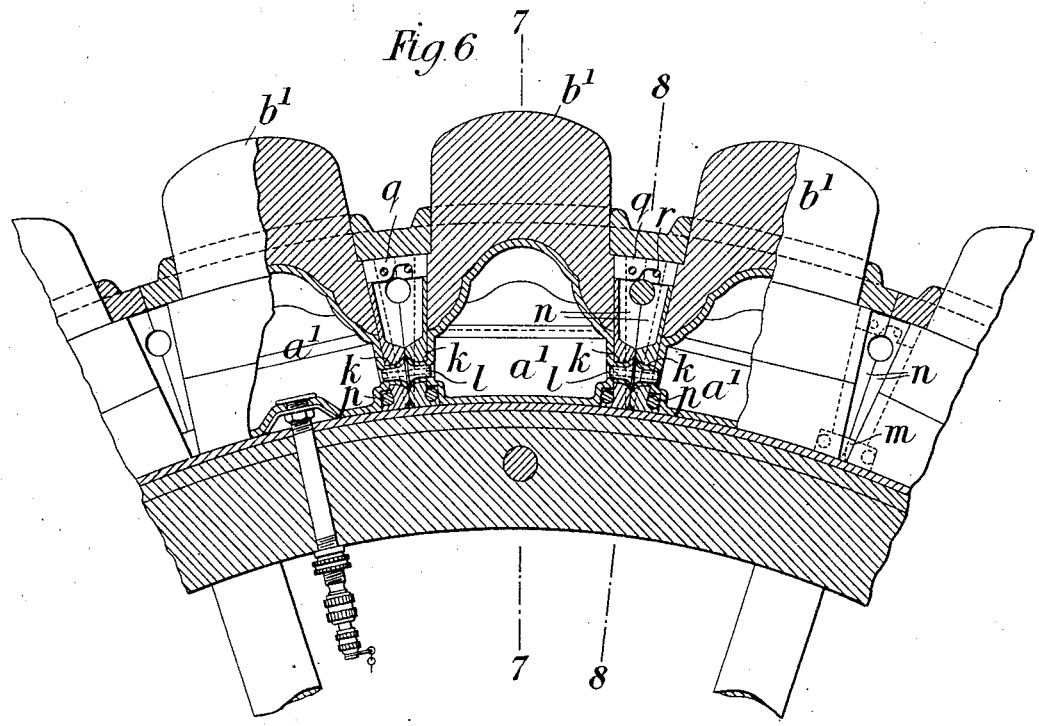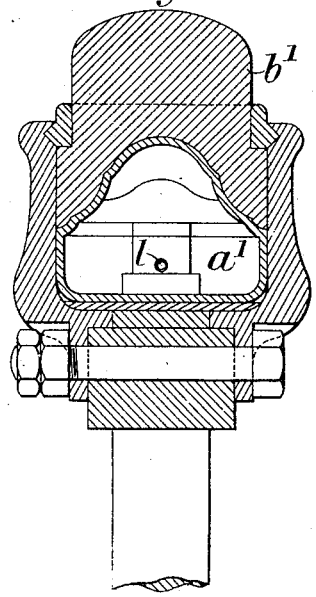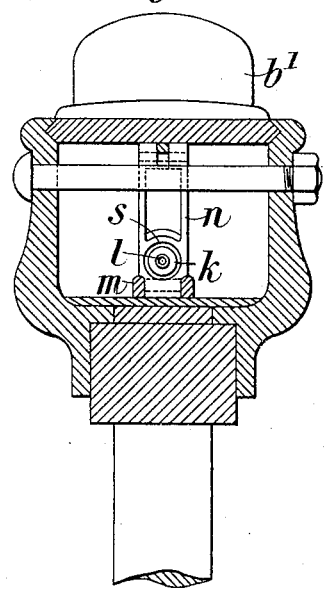

No. 814,068. PATENTED MAR. 6, 1906.
F. G. McKIM.
PNEUMATIC TIRE.
APPLICATION FILED MAR. 14, 1905.
4 SHEETS—SHEET 3.
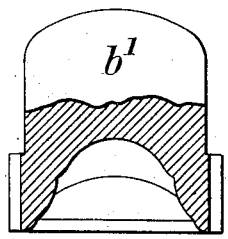
Fig. 9.
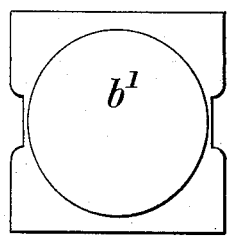
Fig. 10.
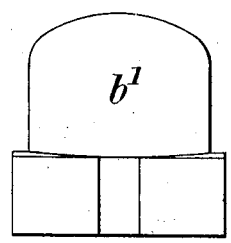
Fig. 11.
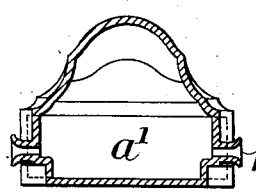
Fig. 12.
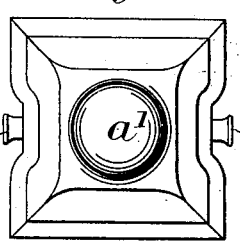
Fig. 13.
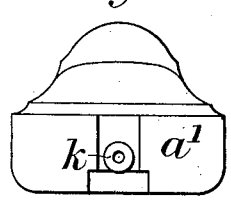
Fig. 14.
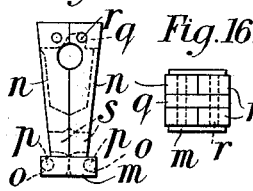
Fig. 15. Fig. 16.
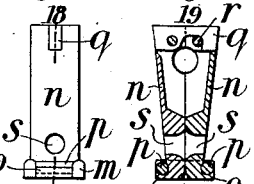
Fig. 17. Fig. 18. Fig. 19.
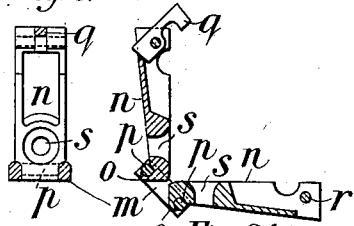
Fig. 20.
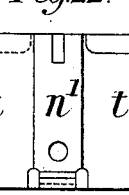
Fig. 21. Fig. 22.
Fig. 23.
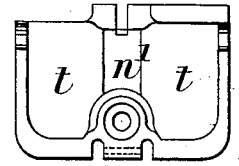
Fig. 24.
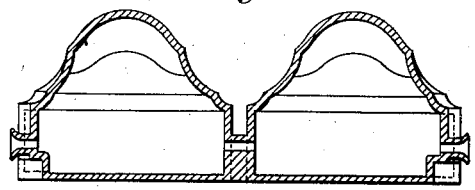
Fig. 25.
Fig. 26.
Witnesses
John E. Dousfield.
C. G. McKim
Inventor
F. G. McKim No. 814,068. PATENTED MAR. 6, 1906.
F. G. McKIM.
PNEUMATIC TIRE.
APPLICATION FILED MAR. 14, 1905.

4 SHEETS—SHEET 4.

Witnesses.

Inventor.

UNITED STATES PATENT OFFICE.

FREDERICK GEORGE McKIM, OF LONDON, ENGLAND.

PNEUMATIC TIRE.

No. 814,068.     Specification of Letters Patent.     Patented March 6, 1906.

Application filed March 14, 1905. Serial No. 250,047.

*To all whom it may concern:*

Be it known that I, FREDERICK GEORGE McKIM, a subject of the King of Great Britain, residing at 115 Finsbury Pavement, London, England, have invented new and useful Improvements in or Relating to Pneumatic Tires, of which the following is a specification.

This invention relates to pneumatic tires, chiefly designed for use upon heavy road-motor and other vehicles, and has for its object to provide a tire which is practically unpuncturable, is not subjected to side slip, and in the unlikely event of a puncture or rupture of the air-tube taking place can be repaired expeditiously and with facility.

According to my invention I construct a tire of a number of independent air-chambers adapted to be placed in series in a suitably-shaped rim and each of which is provided at each of its ends with an orifice. The orifices of the contiguous chambers are in alinement, so that the whole series of chambers within the rim forms a complete and continuous air chamber or tube. The adjacent orifices of contiguous chambers are provided with means, such as nipples or clips, by which they are connected together in an airtight manner, and distance-pieces may also be provided between the adjacent chambers. The chambers are either formed or furnished with solid tread portions which project peripherally from the rim.

Figure 27:
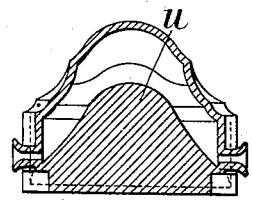
Figure 28:
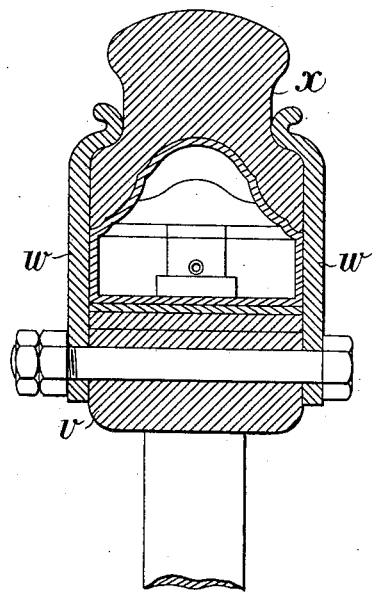

In the accompanying drawings, Figure 1 is a longitudinal section of a portion of a tire and rim constructed according to the invention. Fig. 2 is a section on the line 2 2, Fig. 1. Fig. 3 is a longitudinal vertical section of one of the independent chambers with the attached tread-piece. Fig. 4 is a detached view of a connecting-nipple. Fig. 5 is a view of a convenient form of distance-piece. Fig. 6 is a sectional elevation illustrating a modified form of the tire. Fig. 7 is a section on the line 7 7, Fig. 1. Fig. 8 is a section on the line 8 8, Fig. 1. Fig. 9 is a sectional elevation of a detached tread-piece. Fig. 10 is a plan view thereof. Fig. 11 is an elevation at right angles to Fig. 9. Fig. 12 is a vertical section of one of the air-chambers. Fig. 13 is a plan view of the chamber. Fig. 14 is an elevation at right angles to Fig. 12. Fig. 15 is a side view of the clip for the air-chambers. Fig. 16 is a plan view thereof. Fig. 17 is a view at right angles to Fig. 15. Fig. 18 is a section on the line 18 18, Fig. 17. Fig. 19 is a section on the line 19 19, Fig. 18. Fig. 20 is a view similar to Fig. 18, but showing the clip in the open position. Fig. 21 is a view similar to Fig. 15, but illustrating a modified form of the clip. Fig. 22 is a view at right angles to Fig. 21. Fig. 23 is a plan view of the clip. Fig. 24 is an elevation of half the modified form of clip. Fig. 25 is a vertical section illustrating a modification wherein the air-chambers are in pairs. Fig. 26 is a view of a distance-piece for use between the two chambers of each connected pair. Fig. 27 is a vertical section of an air-chamber, illustrating a further modification; and Fig. 28 is a vertical section of the tire shown applied to a modified construction of rim.

Referring first to the form of tire illustrated in Figs. 1 to 5, *a a* represent the independent air-chambers, each of which is formed integral with the tread-piece *b*. *c c* are the orifices which are formed at opposite ends of each of the chambers *a*, the said orifices being, as indicated, of a conical shape. The separate air-chambers *a* are placed in a series in a hollow rim, so that they together form a complete air-chamber, the adjacent orifices of contiguous chambers being connected together by means of the double-coned nipples *d*. The rim may be of any suitable construction. In the drawings it is illustrated as being composed of the felly *e*, to which are bolted two side plates *f f*, and of the cover or cap *g*, which is made with a number of holes *h*, through which the aforesaid tread-pieces *b* of the air-chambers protrude, as clearly indicated in Figs. 1 and 2. *i i* are distance-pieces which are introduced between the adjacent chambers *a a*, so that each of the said chambers is practically inclosed in its own independent box or case formed by the rim and the distance-pieces. *f' f'* are bolts which are passed through the side plates *f f* and the distance-pieces *i i* for the purpose of staying the side plates *f f* together at the upper part. When the air-chambers *a* have been placed within the rim and connected together by means of the nipples *d* and the cap or cover *g* of the rim secured in place, the air-chambers are inflated to the requisite pressure, this being effected in one operation by means of the inflation-nipple *j* in connection with one of the air-chambers *a*.

In the tire above described the tread-pieces *b* are integral with the air-chambers *a*, and the joints between the contiguous chambers are effected by means of the nipples, the pressure of the air within the chambers being relied upon for obtaining hermetic joints. In the modification illustrated in Figs. 6 to 24 the joints between the chambers are obtained by means of special clips, and the tread-pieces of the tire are made independent of the air-chambers upon which they rest. In these figures, $a'$ $a'$ represent the air-chambers, which are advantageously of the profile clearly shown in Figs. 12, 13, and 14 and each of which is provided at each end with a projecting soft nipple $k$, forming the orifice, and into which the one end of the double-coned connecting-piece $l$ is passed, as shown in Fig. 6. $b'$ $b'$ are the separate tread-pieces, and these are also advantageously of the shape illustrated in Figs. 9, 10, and 11, their bases being hollowed out, as shown, to conform to the contour of the upper part of the air-chambers, onto which they neatly fit, as will be seen in Figs. 6 and 7.

Figs. 15 to 20 illustrate a form of clip for clasping the nipple-tubes $k$ $k$ onto the double-coned connecting-pieces $l$ $l$ so as to provide hermetic joints between the adjacent pairs of air-chambers $a'$ $a'$. The clip shown comprises a link $m$ and the two leaves or parts $n$ $n$, each of which is provided at its lower end with an external hook $o$, adapted to be engaged with one of the transverse bars $p$ of the link. The two leaves or parts $n$ are hooked onto the opposite bars $p$ of the link and can then be brought together into the position shown in Figs. 15 and 16, and they are locked in this position by means of the catch $q$, which is hinged to one of the clip parts $n$ and is adapted to engage a pin $r$ upon the other part $n$. At its lower end each of the parts $n$ is formed with the taper hole $s$, the holes in the two parts being immediately opposite one another when the said two parts are placed in position on the link and being designed to receive the aforementioned nipple-tubes $k$ $k$ upon the ends of the adjacent chambers. Instead of the link $m$ any other suitable pivot or pivot-piece can be employed to serve as a hinge for the parts $n$. This arrangement is employed as follows—that is to say, the nipple $k$ of one chamber is passed through the hole $s$ at the lower part of one of the clip parts $n$ and the other clip part $n$ is similarly attached to the nipple or tube $k$ of the adjacent air-chamber $a'$; the connecting nipple or plug $l$ is then introduced into one of the orifices $s$, and the two clip parts $n$ are secured to the link $m$ and closed against one another in the manner shown in Fig. 15, the other end of the double-coned connection $l$ passing into the other hole $s$, so that when the two parts $n$ are secured together by the catch $q$ the two flexible nipples $k$ $k$ are firmly clamped upon the double-coned connecting-piece, as shown in Fig. 6, thus forming an air-tight joint between the chambers.

Figs. 21 to 24 show a modified construction of the clip. In this construction each of the clip parts $n'$ is formed integral with lateral wings $t$ $t$, so that when the two parts are placed together, as above described, they form a combined clip and distance-piece. The shape of the two parts is such that the device as a whole when in position between the two adjacent chambers completely fills the space between them within the rim.

In the tires above described each of the air-chambers is made separately; but it will be obvious that two or more such chambers can be permanently connected together and the pairs connected in series to form the complete continuous chamber. Such an arrangement is illustrated in Fig. 25, which is a sectional view illustrating a couple of chambers connected together or formed in one piece. With a pair of chambers made in this way it is advantageous to provide distance-pieces between the adjacent ends of the connected chambers to take the place of the distance-pieces attached to the clip. Such a distance-piece is shown in Fig. 26.

In practice the tread-pieces $b$ of the tire are made of such a length that under the compression of the air-chamber due to the weight of the vehicle when running the said tread-pieces are not pushed into the rim to such an extent that the upper edge of the said rim can come into direct contact with the ground. To prevent the inner end of each tread-piece from causing damage to the air-chamber when the tire is deflated or under abnormal compression, I may provide an elastic pad $u$ (see Fig. 27) at the bottom of the air-chamber and which serves as a cushion or buffer to receive the impact of the inner end of the tread-piece.

Fig. 28 illustrates the tire applied to a modified construction of wheel-rim comprising a felly $v$, to which are bolted the two side plates $w$ $w$. The said side plates $w$ $w$ are turned inward at their upper ends, so as to provide a neck narrower than the space within the rim comprised between the two side plates. The tread-piece is also made narrower at its upper part, as indicated at $x$, so as to fit the aforesaid neck in the rim. By this means I am enabled to dispense with the employment of the cap or cover $g$, as shown in Figs. 1 and 2.

With tires constructed as above described it will be obvious that complete protection against puncture is provided owing to the employment of the projecting tread portions, the discontinuity of which also obviates the liability of skidding or side slip owing to the grip which the discontinuous tread enables the tire to have upon the road. Furthermore, it will be clear that should a chamber be punctured or ruptured from any unforeseen cause it can be quickly removed and repaired or replaced by a new chamber with facility.

Having now particularly described and ascertained the nature of my said invention and in what manner the same is to be performed, I declare that what I claim is—

1. In a tire of the kind described, the combination with a series of air-chambers, of distance-pieces located between the same, a covering for said air-chambers and said distance-pieces and tread portions on said air-chambers constructed to project through said covering, substantially as described.

2. In a tire of the kind described, the combination with a series of air-chambers, of means for affording communication between said air-chambers to form a complete tube, distance-pieces between said air-chambers, a covering for said chambers and distance-pieces and a tread portion on each of said chambers and projecting through said covering, substantially as described.

3. The combination with a series of chambers of a rim provided with upwardly-extending flanges constructed to receive said air-chambers, distance-pieces between said air-chambers, a covering for said air-chambers and distance-pieces, provided with portions adapted to engage with said flanges of said rim, bolts passing through said flanges adapted to lock said covering in said rim and a tread portion on each of said chambers projecting through said covering, substantially as described.

4. The combination with a wheel-rim provided with upwardly-extending flanges, of bolts passing through said flanges and adapted to secure said flanges to the rim, a series of air-chambers adapted to fit between said flanges, distance-pieces between said air-chambers, a covering for said air-chambers and distance-pieces and having portions for engaging said flanges, bolts passing through said flanges and distance-pieces and adapted to retain said covering in position and a tread portion on each of said chambers projecting through said covering, substantially as described.

5. In a tire of the kind described, the combination with a series of air-chambers, of distance-pieces between said air-chambers, a covering for said air-chambers and distance-pieces and independent tread portions for said chambers adapted to protrude through said covering, substantially as described.

6. In a tire of the kind described, the combination with a series of air-chambers provided with convex portions, of distance-pieces between said chambers, a covering for said chambers and distance-pieces and independent tread portions provided with concave faces adapted to engage with the convex portions of said air-chambers, said tread portions being adapted to protrude through said covering, substantially as described.

7. In a tire of the kind described, the combination with a series of air-chambers, the adjacent chambers being provided with nipples, of means for forming air-tight connections between said nipples, distance-pieces between said chambers, a covering for said air-chambers and distance-pieces and a tread portion on each of said air-chambers adapted to protrude through said covering, substantially as described.

8. In a tire of the kind described, the combination with a series of air-chambers, the adjacent chambers being provided with nipples, of connecting-pieces between said nipples, clips provided with portions for engaging said nipples and forming air-tight connections with said connecting-pieces, distance-pieces between said air-chambers, a covering for said air-chambers and distance-pieces, and a tread portion on each of said air-chambers adapted to project through said covering, substantially as described.

9. In a tire of the kind described, the combination with a series of air-chambers, the adjacent chambers being provided with nipples, of connecting-pieces between said nipples, clips provided with portions for engaging said nipples and forming air-tight connections with said connecting-pieces, laterally-extending wings on said clips adapted to form distance-pieces between said air-chambers, a covering for said chambers and clips and a tread portion on each of said air-chambers adapted to project through said covering, substantially as described.

10. The combination with a wheel-rim, of a series of air-chambers each of which has a flexible nipple at either end and a projecting tread-piece separate from, or integral with, it, of clips for connecting together the contiguous nipples of adjacent air-chambers, each of the said clips comprising two parts adapted to be hinged and locked together and having a lateral wing, substantially as hereinbefore described.

11. A clip for connecting together the independent air-chambers of pneumatic tires comprising the two parts having holes to receive the nipples of the air-chambers to be connected, a link for hinging the two parts together at their lower ends, a catch for locking the two parts together, a plug or nipple for insertion in the nipples between the two clip parts, and lateral wings integral with each of the said parts, substantially as hereinbefore described.

FREDERICK GEORGE McKIM.

Witnesses:
JOHN E. BOUSFIELD,
C. G. REDFERN.